United States Patent [19]

Bögle

[11] Patent Number: 4,700,487
[45] Date of Patent: Oct. 20, 1987

[54] PROFILE SENSING ARRANGEMENT

[75] Inventor: Normann Bögle, Reutlingen, Fed. Rep. of Germany

[73] Assignee: Wilhelm Bögle KG, Reutlingen, Fed. Rep. of Germany

[21] Appl. No.: 880,411

[22] Filed: Jun. 30, 1986

[30] Foreign Application Priority Data

Jul. 6, 1985 [DE] Fed. Rep. of Germany ....... 3524211

[51] Int. Cl.$^4$ .............................................. G01B 5/20
[52] U.S. Cl. ................................................... 33/175
[58] Field of Search ........................... 33/175, 176, 177

[56] References Cited

U.S. PATENT DOCUMENTS

| | | | |
|---|---|---|---|
| 1,019,923 | 3/1912 | Schelter | 33/175 |
| 1,261,438 | 4/1918 | Reinhardt | 33/175 |
| 2,222,127 | 11/1940 | Turner | 33/175 |
| 2,721,391 | 10/1955 | Duyke | 33/175 |
| 3,678,587 | 7/1972 | Madden | 33/175 |

Primary Examiner—Harry N. Haroian
Attorney, Agent, or Firm—Michael J. Striker

[57] ABSTRACT

A profile sensing device comprises a housing having two longitudinal sides, a plurality of sensing rods supported in the housing substantially parallel to one another and extending beyond both longitudinal sides of the housing, elements for braking the sensing rods and arranged in the housing, the housing is composed of a synthetic plastic material and provided with a plurality of housing webs formed so that the sensing rods are arranged in groups between the webs, the housing also has outer sides provided with coupling projections and openings.

24 Claims, 8 Drawing Figures

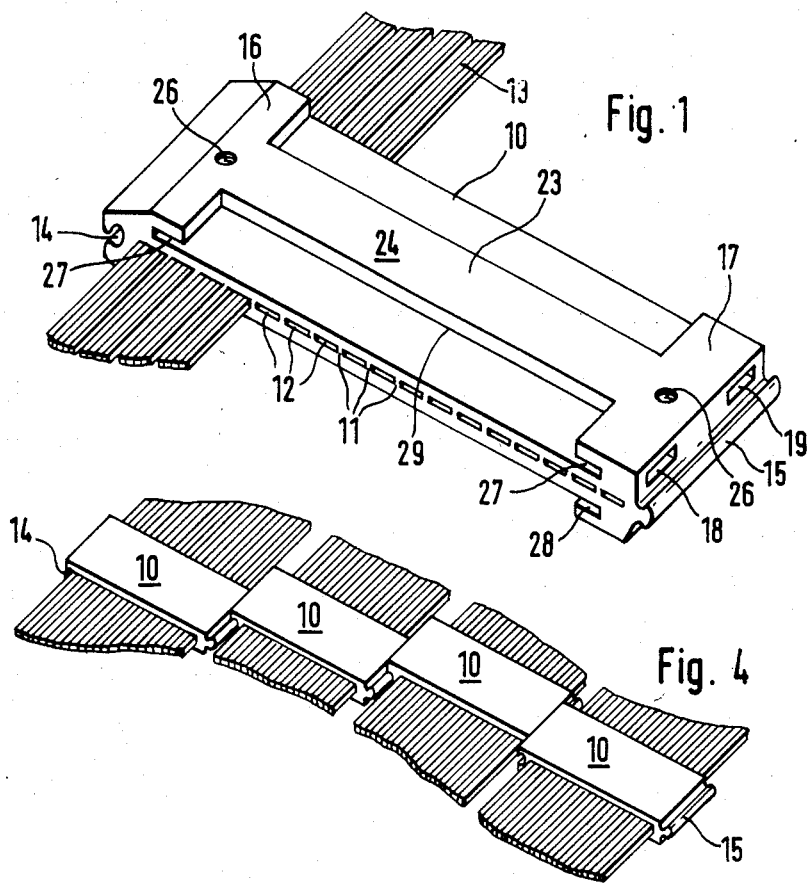
Fig. 1
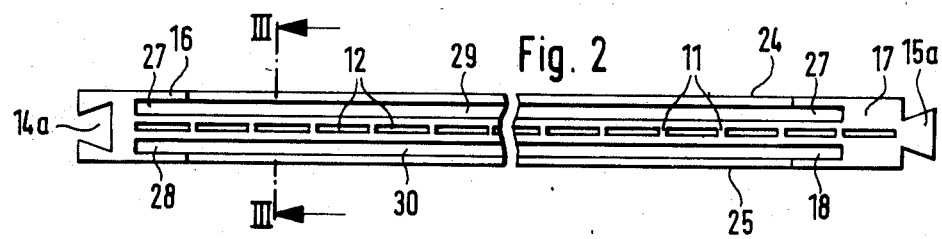
Fig. 4
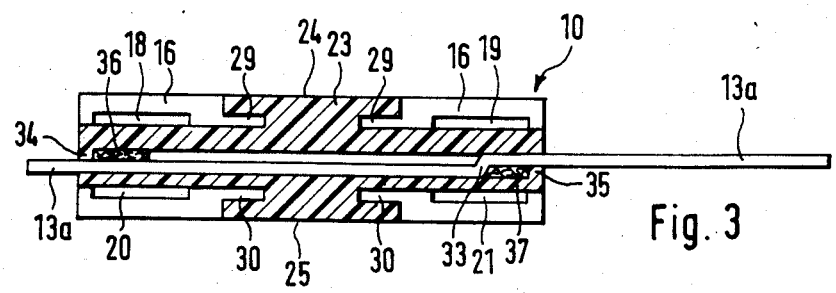
Fig. 2
Fig. 3

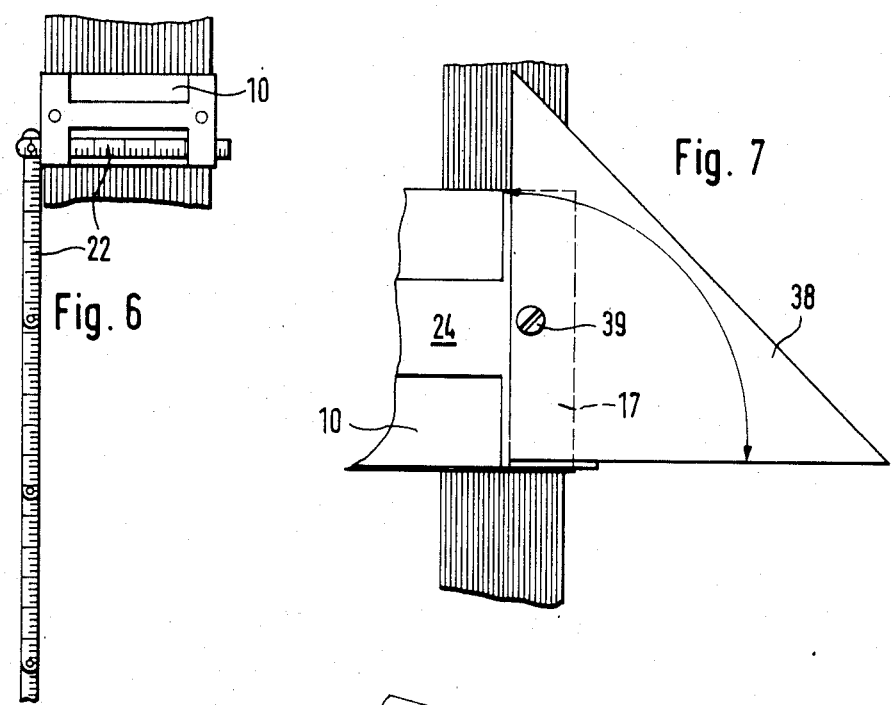
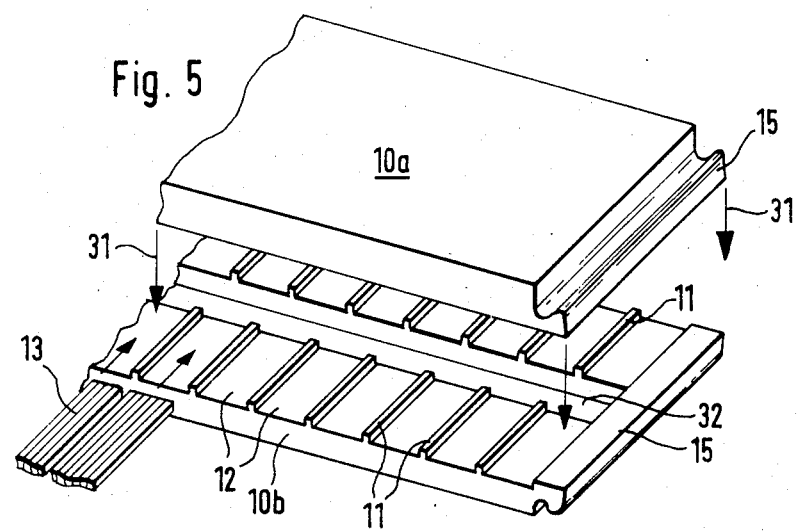
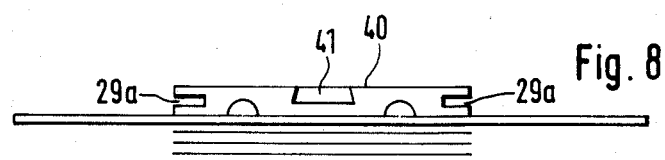

PROFILE SENSING ARRANGEMENT

BACKGROUND OF THE INVENTION

The present invention relates to a profile sensing arrangement.

More particularly, it relates to a profile sensing arrangement which has a plurality of longitudinally displaceable parallel sensing rods which are supported in a housing and extend beyond both longitudinal sides of the housing, and in which braking means is provided in the housing for acting upon the sensing rods. Profile sensing arrangements of the above mentioned general type are known in the art. A known profile sensing arrangement has a housing which is composed of two identical halves pressed of a metal sheet. Both housing parts are connected with one another at their both ends, and the sensing rods are arranged in the plane of separation of the housing. The known profile sensing arrangements have the disadvantage that they can have only a short length, since their both housing halves are connected with one another only at their ends and in the event of great lengths, opening of the housing parts is possible with the resulting danger of falling of the sensing rods out or displacement of the sensing rods over one another. Thereby, the known profile sensing devices can sense profiles of great sizes only by portions, and at the transition points of the individual sensing regions sensing errors can easily take place.

SUMMARY OF THE INVENTION

Accordingly, it is an object of the present invention to provide a profile sensing arrangement which avoids the disadvantages of the prior art.

More particularly, it is an object of the present invention to provide a profile sensing arrangement which is formed so that it can have a greater length and is adjustable at all sides.

In keeping with these objects and with others which will become apparent hereinafter, one feature of the present invention resides, briefly stated, in that the housing of the arrangement is formed of synthetic plastic material, the sensing rods are arranged in groups which are separated from one another by housing webs, and the housing has at its outer side projections and openings for coupling the housing with other devices and/or with a housing of another similar profile sensing arrangement.

When the housing in accordance with the present invention is composed of two halves, a support of both housing halves along the housing webs takes place. Both housing halves can be fixedly connected with one another advantagously along the housing webs by ultrasonic welding. In this manner the profile sensing arrangement can be made of any length, and moreover, can be coupled by the profiled outer side of the housing with other profiled sensing arrangements, holders, measuring arrangements, and the like. It is thereby guaranteed that with the inventive profile sensing arrangement also wide profiles can be sensed, and also the angular position of the profiles relative to a reference plane can be taken into consideration.

Advantageously, the mutually abutting sensing rods can be subdivided into groups of equal size, and the housing can have a width corresponding to the diameter of the sensing rods or its integral multiple. In this manner, a division of the sensing rods in correspondence with the meter rod is obtained, and with the placed arrangement the measuring conditions can be adapted to the sensed profile. This dimensioning of the profile sensing arrangement in correspondence with the meter rod take place also at the end projections. The housing is provided at its one end with an undercut web forming the projection and at its other end with an undercut groove forming the opening and corresponding to the undercut projection. Therefore, one profile sensing arrangement can be inserted with its web into the groove of another profile sensing arrangement for form-locking coupling of both arrangements with any width.

In contrast to the known profile sensing arrangements, the inventive profile sensing arrangement has a housing which can be provided at its upper side and/or lower side with a flat abutment surface extending parallel to a plane formed by the sensing rods. The housing can advantageously be provided with throughgoing openings at least at one side of the plane defined by the sensing rods and extending in the longitudinal direction of the housing. A measuring rod or an aligning strip can be inserted in the throughgoing openings for holding or straightening. Advantageously the housing can be provided at least at its one side of the plane defined by the sensing rods with at least one insertion groove extending in the longitudinal direction and/or in a transverse direction, so that insertion pins of holding devices and/or adjusting devices and the like can be inserted in the insertion groove. The synthetic plastic housing has a further advantage that it is possible to insert threaded bushes or threaded pins which form coupling elements on the upper side and/or the lower side of the housing. Also, the housing can be formed so that it is suitable for receiving such sensing rods which are bent and therefore cannot be lost from the housing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a perspective view of a profile sensing arrangement in accordance with one embodiment of the invention;

FIG. 2 is a front view of the profile sensing arrangement of FIG. 1, on an enlarged scale and partially modified;

FIG. 3 is a view showing a section of the profile sensing arrangement, taken along the line III—III in FIG. 2, on an enlarged scale;

FIG. 4 is a view showing four profile sensing arrangements coupled with one another;

FIG. 5 is a perspective partial view of a two-part housing of the inventive profile sensing arrangement, before assembling of the housing halves;

FIG. 6 is a view showing the placed profile sensing arrangement mounted on a metering rod;

FIG. 7 is a view showing a profile sensing arrangement mounted on an angle template; and FIG. 8 is a view showing a cross-section of a profile sensing arrangement in accordance with another embodiment of the invention.

DESCRIPTION OF THE PREFERRED EMBODIMENTS

The profile sensing arrangement shown in FIG. 1 has a housing 10 composed of a synthetic plastic material. The housing 10 has a plurality of housing webs 11 which are separated from one another by throughgoing slots 12 for receiving sensing rods 13 composed of a plurality of wire portions. The throughgoing slots 12 have identical widths and dimensioned for receiving a predetermined number of the sensing rods 13, for example, for receiving of four or nine sensing rods. The housing webs 11 have such a width which substantially corresponds to the diameter of one sensing rod 13 or its multiple.

The housing 10 is provided at its one end with a transverse groove 14 which extends in a central plane. The groove 14 has an undercut groove edge. The other end of the housing 10 is provided with an undercut transverse web 15 which also extends in a central plane. The transverse web 15 has a shape which exactly corresponds to the shape of the transverse groove 14. Therefore, as can be seen from FIG. 4, several provile sensing arrangements can be firmly connected with one another by their housings. The housings 10 can be arranged in alignment with one another or in a staggered manner relative to one another in correspondence to the size and depth of a profile to be sensed. An aligned arrangement of several profile sensing arrangements plugged with one another can be obtained by means of a not shown aligning web. The housing is provided for the aligning web with rectangular openings 18, 19, 20, 21 which extend in a longitudinal direction of the housing 10 and formed in reinforced housing portions 16 and 17 at both sides of the central plane, as shown in FIG. 3. By the openings 18-21, the housing 10 can also be plugged on a measuring rod 22 shown in FIG. 6. The profile sensing arrangement shown in FIG. 2 is provided both with a transverse groove 14a and with a transverse web 15a of a dove-tailed shape. The width of the ends of two profile sensing arrangements inserted in one another, corresponds to an integral multiple of the diameter of the sensing rod 13.

Both reinforced end portions 16 and 17 of the housing 10 are connected on the upper side and on the lower side of the housing respectively by sensor webs 23 which have the same heights. The housing portions 16, 17 and 23 have on the upper side a flat outer surface 24 which extends parallel to the central plane of the housing 10 and on the lower side of the housing 10 a correspondingly flat outer surface 25. A threaded bush 26 is formed in the region of the flat outer surface 24 of the reinforced end portions 16 and 17 of the housing 10. Instead of the threaded bush, also openings for receiving threaded pins can be provided. Plug grooves 27, 28 and 29, 30 are formed on the reinforcing end portions 16 and 17 and the central web 23, both on the upper side and on the lower side of the housing 10, as can be seen in FIGS. 1, 2 and 3. The plug grooves 27-30 extend parallel to the central plane of the housing 10 determined by the sensing rod 13. The plug grooves 27 and 28 extend in a transverse direction and the plug grooves 29 and 30 extend in a longitudinal direction of the housing 10. The plug grooves are formed for receiving matching plug webs of holding devices and the like.

As can be seen from FIG. 5, the housing 10 can be assembled of two housing parts, namely an upper housing part 10a and a lower housing part 10b. In the shown embodiment the housing webs 11, and the transverse slots 12 extending between them for the sensing rods 13 are formed in the lower housing part 10b. The transverse web 15 is formed at one end of the housing so that its one half is formed in the upper housing part 10a and its other half is formed in the lower housing part 10b. After insertion of the sensing rod 13 into the lower housing part 10b, the upper housing part 10a, as shown by the arrow 31 in FIG. 5, is placed onto the housing part 10b. Then both housing parts are connected with one another along the housing web 11 and along the transverse web 15 by ultrasonic welding.

The interior of the housing 10 can be formed in different ways. In the embodiment shown in FIG. 5, in which the non-curved straight sensing rod 13 is used, the lower housing part 10b has a central longitudinal groove 32 accommodating a not shown felt strip for braking the displacement of the sensing rod 13. FIG. 3 shows a cross-section of a housing 10 for a sensing rod 13a which has a bend 33 in its center. The housing 10 is also assembled here from two housing parts. The openings of the slot 12 on both longitudinal sides of the housing 10 are offset relative to one another in correspondence with the bend of the sensing rod 13. This is achieved by edge webs 34 and 35 in both housing parts. Felt strips 36 and 37 are arranged behind the edges 34 and 35 for braking the displacement of the sensing rod 13a. Because of the bend 33 and the edge web 34, 35, the sensing rods 13 cannot displace outwardly of the housing 10. The bend 33 forms at both sides an abutment with the felt strips 36 or 37. One of them abuts against the sensing rod from above, while the other abuts against the sensing rod from below.

FIG. 7 shows an end region of the housing 10 of a profile sensing arrangement. An angle template 38 abuts on a flat outer surface 24 of the reinforcing end portion 17 and is fixed in the threaded bush 26 (FIG. 1) by means of a screw 39. Simultaneously the housing 10 can be mounted on a holder inserted in the plug grooves 27, 29 or 28, 30.

FIG. 8 shows a transverse profile of a housing of a profile sensing device, which has a continuous flat upper side 40 with a central dove-tail shaped longitudinal groove 41 and with plug grooves 29a which are offset outwardly to the longitudinal edges.

It will be understood that each of the elements described above, or two or more together, may also find a useful application in other types of constructions differing from the types described above.

While the invention has been illustrated and described as embodied in a profile sensing arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A profile sensing device, comprising a housing having two longitudinal sides; a plurality of sensing rods supported in said housing substantially parallel to one another and extending beyond both longitudinal sides of said housing, said housing also having outer sides provided with coupling projections and openings, said sensing rods defining a central plane, said housing being elongated and provided with a plurality of throughgoing openings which are located at one side of said central plane and extend in a longitudinal direction of said housing for inserting an additional element.

2. A profile sensing arrangement as defined in claim 1, wherein said coupling projections and openings are formed so that said housing can be connected with other devices.

3. A profile sensing arrangement as defined in claim 1, wherein said coupling projections and openings are formed so that said housing can be connected with another such housing of another such profile sensing arrangement.

4. A profile sensing arrangement as defined in claim 1, wherein said housing webs are formed so that said sensing rods can be arranged between said housing webs in groups having identical sizes, said sensing rods having a predetermined diameter, said housing webs having a width which corresponds to said diameter of said sensing rods.

5. A profile sensing arrangement as defined in claim 4, wherein said housing webs have a width which corresponds to an integral multiple of said diameter of said sensing rods.

6. A profile sensing arrangement as defined in claim 1, wherein said housing has an upper side and a lower side, said sensing rods forming a central plane, at least one of said upper and lower sides having a flat surface which extends parallel to said central plane.

7. A profile sensing arrangement as defined in claim 6, wherein both said upper and lower sides have an outer surface which extends parallel to said central plane.

8. A profile sensing arrangement as defined in claim 1, wherein said throughgoing openings are formed such that a measuring rod can be inserted in them.

9. A profile sensing arrangement as defined in claim 1, wherein said throughgoing openings are formed such that an aligning strip can be inserted in them.

10. A profile sensing arrangement as defined, in claim 1, wherein said sensing rods define a plane each of, said openings of said housing being formed as an insertion groove provided at least at one side of said plane and being formed at least partially throughgoing.

11. A profile sensing arrangement as defined in claim 10, wherein said housing is elongated, said insertion groove extending in the direction of elongation of said housing.

12. A profile sensing arrangement as defined in claim 10, wherein said housing is elongated, said insertion groove extending in a direction which transverse to the direction of elongation of said housing.

13. A profile sensing arrangement as defined in claim 1, wherein said housing has an upper side and a lower side and is provided with insertion openings at at least one of said upper and lower sides; and further comprising threaded members inserted in said insertion openings and formed as coupling elements.

14. A profile sensing arrangement as defined in claim 13, wherein said insertion openings are provided at said upper and lower sides of said housing, said threaded members being inserted in said insertion openings at said upper and lower sides of said housing.

15. A profile sensing arrangement as defined in claim 13, wherein said threaded members are formed as threaded bushes.

16. A profile sensing arrangement as defined in claim 13, wherein said threaded members are formed as threaded pins.

17. A profile sensing arrangement as defined in claim 1, wherein said housing is formed of two parts which are connected with one another in the region of said housing webs; and further comprising means for connecting said parts of said housing with one another.

18. A profile sensing arrangement as defined in claim 17, wherein said connecting means are formed as an ultrasonic welding seam.

19. A profile sensing device, comprising a housing having two longitudinal sides; a plurality of sensing rods supported in said housing substantially parallel to one another and extending beyond both longitudinal sides of said housing; means for braking said sensing rods and arranged in said housing, said housing being provided with a plurality of housing webs, sensing rods are arranged in groups between said webs, said housing also having outer sides provided with coupling projections and openings formed so that said housing can be connected with another such housing of another such profile sensing arrangement, said housing being composed of a synthetic plastic material and formed of two parts which are connected with one another in the region of said housing webs; connecting means for connecting said parts with one another and formed as an ultrasonic welding seam, said sensing rods having a predetermined diameter, said housing webs having a width which corresponds to an integral multiple of said diameter of said sensing rods.

20. A profile sensing arrangement as defined in claim 19, wherein said housing has two opposite ends, one of said ends being provided with said projection which is formed as an undercut web, while the other of said ends being provided with said opening which is formed as an undercut groove corresponding to said undercut web, so that said undercut web of said housing is engageable in said undercut groove of another such housing for form-locking coupling of two said housings in a displaceable manner relative to one another, said ends of said two housings in the coupled condition having a width which corresponds to an integral multiple of said diameter of said sensing rods.

21. A profile sensing device, comprising a housing having two longitudinal sides; a plurality of sensing rods supported in said housing substantially parallel to one another and extending beyond both longitudinal sides of said housing; means for braking said sensing rods and arranged in said housing, said housing being composed of a synthetic plastic material a provided with a plurality of housing webs formed so that said sensing rods are arranged in groups between said webs, said housing also having outer sides provided with coupling projections and openings, said sensing rods defining a central plane, said housing being elongated and provided with a plurality of throughgoing openings which are located at one side of said central plane and extend in a longitudinal direction of said housing for inserting an additional element.

22. A profile sensing device, comprising a housing having two longitudinal sides; a plurality of sensing rods supported in said housing substantially parallel to one another and extending beyond both longitudinal sides of said housing; means for braking said sensing rods and arranged in said housing, said housing being composed of a synthetic plastic material and provided with a plurality of housing webs formed so that said sensing rods are arranged in groups between said webs, said housing also having outer sides provided with coupling projections and openings, said sensing rods defining a plane, each of said openings of said hosuing being formed as an insertion groove provided at least at one side of said plane and being formed at least partially throughgoing.

23. A profile sensing device, comprising a housing having two longitudinal sides; a plurality of sensing rods supported in said housing substantially parallel to one another and extending beyond both longitudinal sides of said housing; means for braking said sensing rods and arranged in said housing, said housing being composed of a synthetic plastic material and provided with a plurality of housing webs formed so that said sensing rods are arranged in groups between said webs, said housing also having outer sides provided with coupling projections and openings, each of said sensing rods having a central region and is bent in said central region and is bent in said cenral region so as to form rod portion which are offset from one another by a predetermined distance, said housing having slot-shaped outlet openings provided at said longitudinal sides of said housing and offset from one another by a distance corresponding to said distance of said offset of said rod portions, said sensing rods having a predetermiend diameter, and said outlet openings having a width corresponding to said diameter of said sensing rods.

24. A profile sensing device, comprising a housing having two longitudinal sides; a plurality of sensing rods supported in said housing substantially parallel to one another and extending beyond both longitudinal sides of said housing; means for braking said sensing rods and arranged in said housing, said housing being composed of a synthetic material and provided with a plurality of housing webs formed so that said sensing rods are arranged in groups between said webs, said housing also having outer sides provided with coupling projections and openings, said braking means being arranged in said housing in the vicinity of said longitudinal sides, said braking means including a strip arranged near one longitudinal side of said housing and above said sensing rods and a strip arranged at the other longitudinal side of the housing and below said sensing rods as well as in abutment against said sensing rods.

* * * * *